United States Patent [19]

Furman, Jr. et al.

[11] Patent Number: 5,415,739
[45] Date of Patent: May 16, 1995

[54] DETACKIFICATION AGENT FOR ADHESIVES FOUND IN PAPER FIBER FURNISHES

[75] Inventors: Gary S. Furman, Jr., St. Charles, Ill.; James H. Smith, Jr., Vancouver, Wash.

[73] Assignee: Nalco Chemical Company, Naperville, Ill.

[21] Appl. No.: 154,331

[22] Filed: Nov. 18, 1993

[51] Int. Cl.$^6$ ............................................. D21H 17/53
[52] U.S. Cl. ..................... 162/158; 162/164.7; 162/168.1; 162/181.1; 162/181.2; 162/181.4; 162/181.5; 162/189; 162/199; 162/DIG. 4
[58] Field of Search ............... 162/5, 164.1, 168.1, 162/199, 164.7, DIG. 4, 158, 181.2, 181.1, 181.4, 181.5, 189

[56] References Cited

U.S. PATENT DOCUMENTS

| | | | |
|---|---|---|---|
| 4,923,566 | 5/1990 | Shawki et al. | 162/135 |
| 4,956,051 | 9/1990 | Moreland | 162/199 |
| 5,209,823 | 5/1993 | Jansma et al. | 162/146 |

OTHER PUBLICATIONS

*Additives to Combat Contaminants in Secondary Fibers,* Doshi, 1989, Contaminant Problems & Strategies in Wastepaper Recycling, pp. 81–89.
*Stickies Control by Detackification,* Moreland, 1986, 1986 Pulping Conference, pp. 193–196.
*The reduction in Contact Adhesion of Some Adhesives for Paper by Treatment with Zirconium Chemicals,* Brewis, et al. 1988, J. Adhesion, vol. 26 pp. 215–235.

*Primary Examiner*—Peter Chin
*Attorney, Agent, or Firm*—Robert A. Miller; James J. Drake

[57] ABSTRACT

Adhesive contaminants in secondary fiber paper pulps are detackified by the use of a water soluble terphthalate glycol terpolymer.

4 Claims, No Drawings

DETACKIFICATION AGENT FOR ADHESIVES FOUND IN PAPER FIBER FURNISHES

BACKGROUND OF THE INVENTION

1. Field of the Invention

The invention relates to a method of detackifying secondary fiber paper pulps by treating the pulps with a water soluble terphthalate glycol terpolymer.

2. Description of the Prior Art

Various adhesive materials are present in paper fiber furnishes. These can include materials derived from the fibers themselves such as wood pitch, but more importantly and troublesome are adhesive contaminants present in secondary fiber furnishes. These adhesive contaminants, known in the trade as "stickies and tackies" cause numerous problems, both in terms of process and product performance. Specifically, the contaminants deposit on and adhere to machine surfaces throughout the papermachine disrupting operations. They can fill or plug forming fabrics and press felts. Large agglomerates can break loose from the equipment causing holes in the paper sheet or sheet breaks on the papermachine. If the contaminants are present in the paper, they will cause sheet defects or spots. This results in poor visual aesthetics of the paper, and because of poor surface properties can result in printing difficulties. The tackiness of these contaminants may cause adjacent sheets, when wound in roll form, to adhere to one another. This can cause tears, breaks and holes in converting processes.

Secondary fibers refers to recycled paper materials which are repulped to provide the papermaking furnish with raw material for the production of new papers. Sources of secondary fiber may include old newspaper (ONP), old corrugated containers (OCC), mixed office waste, computer printout (CPO), ledger, etc. These once-processed papers contain various types of adhesives (pressure sensitive, hot melts, etc.), inks, and coating binders. Coating binders can include the so called 'white pitch' associated with the repulping of polyvinyl acetate and styrene butadiene coated broke. An extensive list of natural and synthetic adhesives found in different grades of paper is described in the article, "Stickies Control by Detackification", Robert D. Moreland, 1986 Pulping Conference, pp. 193-196. This article also describes in some detail the problem solved by the present invention. A further description of stickies and related problems are found in the disclosures of U.S. Pat. Nos. 4,956,051 and 4,923,566. The disclosures of these references are incorporated herein by reference.

To deal with the problem of stickies and tackies, a number of strategies have been employed by papermakers. These strategies include mechanical and chemical means to either remove or passivate the contaminants. Mechanical means of removing the contaminants include slotted pressure screens, hydrocyclones, and cleaners of various types. Also thermal/mechanical dispersion units are employed to break the contaminants into micron sized particles, which are then difficult to detect in the final sheet. Despite these techniques 100% removal of contaminants by mechanical means cannot be accomplished.

Chemically, several approaches are taken, including passivation or detackification of the sticky contaminant surfaces. Such detackification agents include inorganic materials such as talc and zirconium compounds, organic materials such as polyvinyl alcohol, and hydrophobic synthetic fibers such as polypropylene. In addition, various dispersants may be used to prevent the contaminants from agglomerating. The small dispersed contaminants may be fixed to the paper sheet by the use of cationic polymers. Finally if the contaminant problem becomes severe, solvents will be used to wash and remove the materials from machine surfaces and clothing.

SUMMARY OF THE INVENTION

The invention relates to a method of detackifying adhesive contaminants in paper pulps comprising adding to the pulp a detackifying amount of a water soluble terpolymer formed from the distillation product of several monomers. Monomers may be selected from the group consisting of polyethylene glycol, a phthalic ester moiety derived from either phthalic ester or phthalic acid and a simple glycol. The glycol may be selected from the group consisting of ethylene glycol, propylene glycol, neopentyl glycol and diethylene glycol.

DETAILED DESCRIPTION OF THE PREFERRED EMBODIMENT

The invention comprises a method for detackifying adhesive contaminants in paper pulps composed predominantly of secondary fibers. The adhesive contaminants are prevented from adhering to the surfaces of paper sheets and the equipment used to make the sheets by adding to the pulp or the spray or shower water used to clean the fabrics and felts employed during sheet formation and dewatering, a detackifying amount of a water soluble terpolymer. The terpolymer is formed from the distillation product of the monomers consisting of (a) polyethylene glycol in an amount greater than about 80% by weight of said water soluble dispersant; (b) a phthalic ester moiety derived from either a phthalic ester or a phthalic acid; and (c) a simple glycol selected from the group consisting of ethylene glycol, propylene glycol, neopentyl glycol and diethylene glycol, wherein said phthalic ester moiety and said simple glycol are present in an amount less than about 20% by weight of said water dispersant.

The terpolymer dispersants of the present invention can be prepared using polyethylene glycol, a monomeric glycol, and one or more of the phthalic acids (usually using their dimethyl ester as the starting point). The polymerization is carried out via condensation of these materials at high temperature using appropriate catalysts and eliminates water and/or methanol. The molar ratios are chosen such that sufficient polyethylene glycol is incorporated to produce a water-soluble polymer or oligomer.

If the amount of polyethylene glycol initially charged to the reaction mixture is greater than about 80%, usually between 80-90%, of the finished product weight (after distillation of by-products), the product is water-soluble and thus a dispersant according to this invention. The balance of less than 20% of the finished product weight is made up of the phthalic acid ester moiety and the monomeric glycol, e.g., ethylene glycol.

The phthalic acid ester moiety can be derived from: terephthalic acid, dimethyl terephthalate, isophthalic acid, dimethyl isophthalate, orthophthalic acid, phthalic anhydride, and dimethyl orthophthalate. The monomeric glycol is selected from the group consisting of: ethylene glycol, propylene glycol, neopentyl glycol, and diethylene glycol.

The water-soluble dispersant is preferably the distillation product of polyethylene glycol, dimethyl terephthalate, ethylene glycol, butylated hydroxy toluene, calcium acetate hydrate, antimony trioxide, and 25% solution of phosphorous acid dissolved in ethylene glycol. It may also be the distillation product of polyethylene glycol, terephthalic acid, ethylene glycol, and antimony trioxide.

These terpolymers and their method of preparation are described in detail in U.S. Pat. No. 5,209,823, the disclosure of which is incorporated herein by reference.

Preferably, the terpolymers are added to the papermaking system at a location that will allow intimate contact between the treatment and the contaminated paper stock for a period of at least 30 minutes. The terpolymer concentration should be sufficient to allow for subsequent dilution so that a concentration of 1 ppm to 30 ppm is maintained on the paper machine or at the point where stickies deposit control is desired. Additionally, the polymeric materials may be added to the spray waters utilized during the paper sheet-making process. In this regard, during formation of the fibrous sheet on the wires and/or fabrics, and the rolling or pressing of the fibrous sheet, the wires and fabrics are subjected to various sprays or showers. To insure against any problems due to stickies on wires, felts, or press rolls, it is desirable to add the polymeric materials of the invention to water showers or sprays that are used to clean and lubricate these parts.

When used in the showers or sprays, the terpolymers should be added to the spray water to provide at least 5 ppm. Typical dosages are between 20–50 ppm. Routine experimentation can determine optimum dosages.

EXAMPLES

The following composition, hereafter referred to as composition 1, was evaluated for its ability to passivate adhesive contaminants in secondary fiber pulps. The terpolymer was prepared as follows.

A one-liter round bottom flask was equipped with a stirrer, thermometer, distillation head with condenser, nitrogen inlet and heating mantle. Charged to this flask was:

| | |
|---|---|
| 41.53 gm | terephthalic acid |
| 27.13 gm | ethylene glycol |
| 362.50 gm | polyethylene glycol of 1450 mol. wt. |
| 0.06 gm | antimony trioxide |

The contents of the flask were heated to 240 degrees C. and held at that temperature for a period of four hours during which time 16 ml of distillate was collected. Temperature was then raised to 280 degrees C. over an hour. Vacuum was then gradually applied until 3 mm of mercury pressure was obtained. These conditions were maintained for one hour. The flask was then returned to atmospheric pressure by introduction of nitrogen gas and allowed to return to room temperature. Total distillate during this run was 32.7 grams. A waxy solid resulted which was readily soluble in water at 15% solids. Analysis of the waxy solid gave an acid value of 0.7 mg of KOH per gram of solid. A hydroxyl value of 20 mg of KOH per gram of solid was also determined. A relative viscosity measurement of a 5% aqueous solution of this product was 2.17 as determined in a capillary flow viscometer at 30 degrees C. indicating the product to be a low molecular weight polymer.

"Using the theoretical amount of water from this reaction (9.0 gm) there was 23.7 gm of ethylene glycol removed leaving 3.43 gm (0.055 moles) incorporated. This is a PEG to ethylene glycol ratio of 4.55."

EXAMPLE 1

The ability of the composition of this invention to prevent deposition of wood pitch onto machine surfaces was demonstrated by the following shear-induced deposition test. A synthetic mixture which simulated wood pitch was dispersed in water and placed in a blender. The composition of this invention was then added to the blender at levels up to 1000 ppm. Next a pre-weighed coupon, cut from a polyester forming fabric used in the papermaking process, was suspended in the blender. The blender was turned on at low speed for four minutes. The coupon was removed, air-dried, and re-weighed to determine the amount of pitch deposited on the coupon.

Pitch deposition was monitored under three different sets of conditions in order to evaluate the performance of the composition of this invention:

Condition 1

Synthetic pitch in isopropyl alcohol. 100 ml of a 1% synthetic pitch mixture in isopropyl alcohol (1 g of synthetic pitch) was added to 500 ml of deionized water. 4 ml of a 0.5 molar $CaCl_2$ solution was then added, and the pH was adjusted to 7.0 prior to the start of the test.

Condition 2

Synthetic pitch in isopropyl alcohol with wood pulp. The procedure was the same as above, except that 500 ml of a 1.4% consistency softwood kraft pulp slurry was substituted for the deionized water.

Condition 3

Synthetic pitch in sodium hydroxide with wood pulp. 50 ml of a 2% synthetic pitch mixture in 0.5N NaOH (total of 1 g synthetic pitch) was added to 500 ml of a 1.4% consistency softwood kraft pulp slurry. The pH of the slurry was adjusted to approximately 8.0 and 4 ml of a 0.5 molar $CaCl_2$ solution was added. The pH of the slurry was again adjusted to 7.0 prior to testing.

Results from these tests are shown in Table 1. Under these conditions, the composition of this invention effectively reduced the quantity of pitch which deposited onto the forming fabric coupon.

TABLE 1

Shear induced pitch deposition onto forming fabric coupons.

| Conditions | Test Number | Comp. 1 (ppm) | Deposit Wt. (g) |
|---|---|---|---|
| isopropyl alcohol | 1 | — | 0.1764 |
| | 2 | — | 0.1763 |
| | 3 | — | 0.2149 |
| | 4 | 200 | 0.1911 |
| | 5 | 400 | 0.0380 |
| | 6 | 400 | 0.1446 |
| | 7 | 600 | 0.1242 |
| | 8 | 800 | 0.1303 |
| | 9 | 1000 | 0.0857 |
| isopropyl alcohol + wood pulp | 10 | — | 0.4010 |
| | 11 | — | 0.3309 |
| | 12 | 1000 | 0.0343 |
| NaOH + wood pulp | 13 | — | 0.4268 |
| | 14 | — | 0.2371 |
| | 15 | — | 0.2641 |
| | 16 | 100 | 0.1256 |
| | 17 | 1000 | 0.1609 |

EXAMPLE 2

The ability of composition 1, to detackify sticky contaminant materials was demonstrated by use of a peel adhesion test. This test utilized coupons to represent the machine and sticky contaminant surfaces. Polyester film (MYLAR available from the DuPont Co.) was cut into 1×6 inch coupons and was used to represent a machine surface. Papermaking forming fabrics are made of polyester and forming fabrics are a particular problem area in terms of plugging by adhesive contaminants. An adhesive backed tape was used as the sticky coupon and these coupons were cut to 1×10 inch sizes. The tape, designated #855 and available from the 3M Company, had a styrene butadiene adhesive surface. Styrene butadiene adhesives are a common sticky contaminant in paper systems.

Coupons of each type were placed in beakers filled with deionized water. Also added to the beakers were 10 and 50 ppm levels of composition 1 and Airvol 540 (available from Air Products and Chemicals, Inc.). Airvol 540 is a partially hydrolyzed, high molecular weight polyvinyl alcohol. These chemical treatments were compared to a control sample containing only deionized water. Approximately 4 inches of the total length of the coupons were immersed in the water treatments. The beakers were placed in a water bath controlled to a temperature of 50 degrees C. for a time period of one hour.

After one hour, the coupons were removed from the beakers, laid flat, and blotted of excess water. Each MYLAR-tape coupon pair was then gently adhered together, leaving the excess length of tape as a tab at one end of the MYLAR-tape sandwich. The paired coupons were then placed on a 50 degree C. heated metal surface for two minutes. Good contact with the heated surface was attained by placing a block weighing 381 g on top of the coupon pair. After the two minute heating time the adhered coupons were rolled one time with a rubber covered roller weighing 5 lbs. The coupons were then removed and cooled.

In preparation for the peel adhesion testing of the coupons, a 1×6 inch length of double sided tape #410 (available from the 3M Company) was adhered to a clean steel test panel measuring 4×12 inches. With the outer backing still attached, the tape was firmly adhered to the test panel by rolling it four times with the 5 lb rubber covered roller. The outer backing was removed from the double sided tape and the paired coupon sandwich was placed on top, with the MYLAR side of the coupon attached to the double sided tape. The coupons were adhered to the double sided tape by rolling two times with the 5 lb roller.

The entire sample preparation was then mounted in the peel testing apparatus. Basically, this apparatus consists of a chain-driven platform to which the metal panel is clamped, a set of jaws or grips to which the sample to be peeled is clamped, and a force transducer which senses the force required to peel apart the sample. This force is then recorded and analyzed by computer. To peel a sample, the excess length of tape (4 in tab) was clamped in the grips and the platform was driven, by means of a motor, away from the grips, causing the sample to peel. Peel conditions were as follows: room temperature, peeling angle=90 degrees, peeling speed=12 in/min.

Results for this set of tests are given in Table 2. Each sample condition was performed in duplicate. Peel adhesion values are given in units of g/in and represent an average force value over the entire length of strip peeled. Peel values are further characterized in terms of treated and untreated sections of the strips which were peeled. Treated refers to the portions of the strips which were immersed in the detackifying solutions, whereas untreated refers to those parts of the strips not immersed. The strips exposed to deionized water only are also classified as untreated. For the purposes of illustration, the drawing shows a peel force vs. time plot depicting the difference in adhesion between the treated and untreated portions of the coupons. Also provided in Table 2 are the standard deviations over the course of the peel test and the coefficient of variance (COV), as calculated from the average and standard deviation values.

In Table 2, both the polyvinyl alcohol and composition 1 treatments had a large effect in decreasing the adhesion of the styrene-butadiene tape to the polyester coupon. Both materials functioned as detackifying agents. Deionized water alone had little effect on the adhesion of the coupons.

EXAMPLE 3

In this example, peel adhesion testing was performed according to the method given in Example 2. However, two different tapes were used to simulate sticky materials. Tape #396 (3M Company) utilized an ethylene vinyl acetate adhesive and tape #472 (3M Company) again utilized a styrene butadiene adhesive but on a thicker backing material. Treatments consisted of composition 1, Airvol 540, and a commercial epichlorohydrin/dimethyl amine (EPI/DMA) polymer.

Results for these experiments are shown in Table 3. Comparatively, the ethylene vinyl acetate showed stronger adhesion than the styrene butadiene adhesive. For the ethylene vinyl acetate, both composition 1 and Airvol 540 had positive detackifying effects. The most beneficial effect was produced by

TABLE 2

| Treatment | Run | Peel Adhesion (g/in) | | | | | | % Decrease |
|---|---|---|---|---|---|---|---|---|
| | | Untreated | | | Treated | | | |
| | | Avg. | Std. Dev. | COV (%) | Avg. | Std. Dev. | COV (%) | |
| Control | 1 | 720.25 | 101.16 | 14.05 | | | | |
| | 2 | 803.70 | 85.69 | 10.66 | | | | |
| 10 ppm PVOH | 1 | 797.23 | 119.59 | 15.00 | 265.04 | 109.32 | 41.25 | 66.76 |
| | 2 | 765.41 | 244.44 | 31.94 | 94.63 | 25.82 | 27.28 | 87.64 |
| 50 PPM PVOH | 1 | 709.94 | 123.96 | 17.46 | 335.63 | 117.49 | 35.01 | 52.72 |
| | 2 | 922.29 | 122.65 | 13.30 | 410.63 | 246.75 | 60.09 | 55.48 |
| 10 ppm Comp 1 | 1 | 836.54 | 175.57 | 20.99 | 434.23 | 118.22 | 27.23 | 48.09 |
| | 2 | 870.30 | 93.40 | 10.73 | 463.71 | 117.25 | 25.29 | 46.72 |
| 50 ppm Comp 1 | 1 | 959.02 | 133.83 | 13.95 | 318.70 | 61.39 | 19.26 | 66.77 |

TABLE 2-continued

| | | Peel Adhesion (g/in) | | | | | | |
|---|---|---|---|---|---|---|---|---|
| | | Untreated | | | Treated | | | |
| Treatment | Run | Avg. | Std. Dev. | COV (%) | Avg. | Std. Dev. | COV (%) | % Decrease |
| | 2 | 850.94 | 105.69 | 12.42 | 261.06 | 42.17 | 16.16 | 69.32 |

TABLE 3

| | | | Peel Adhesion (g/in) | | | | | | |
|---|---|---|---|---|---|---|---|---|---|
| Adhesive | | | Untreated | | | Treated | | | |
| Type | Sample | Run | Avg | Std. Dev. | COV | Avg | Std. Dev. | COV | % Decrease |
| ethylene vinyl | Control | | 2472.79 | 215.76 | 8.73 | | | | |
| acetate | 5 ppm PVOH | | 2865.88 | 194.23 | 6.78 | 1635.97 | 141.36 | 8.64 | 42.92 |
| (tape 396) | 5 ppm Comp 1 | | 3022.46 | 173.71 | 5.75 | 1051.01 | 101.50 | 9.66 | 65.23 |
| | 5 ppm EPI/DMA | | NM | | | NM | | | |
| styrene | Control | 1 | 554.42 | 24.93 | 4.50 | 385.63 | 66.04 | 17.13 | 30.45 |
| butadiene | | 2 | 562.49 | 35.06 | 6.23 | 404.90 | 32.63 | 8.06 | 28.02 |
| (tape 472) | 5 ppm EPI/DMA | 1 | 569.19 | 37.22 | 6.54 | 426.33 | 13.64 | 3.20 | 25.10 |
| | | 2 | 602.83 | 40.69 | 6.75 | 447.72 | 21.51 | 4.81 | 25.73 |
| | 5 PPM PVOH | 1 | 535.67 | 26.94 | 5.03 | 317.30 | 42.15 | 13.29 | 40.77 |
| | | 2 | 583.90 | 40.08 | 6.86 | 303.48 | 22.04 | 7.26 | 48.03 |
| | 5 ppm Comp 1 | 1 | 577.97 | 40.74 | 7.05 | 241.01 | 20.14 | 8.36 | 58.30 |
| | | 2 | 596.16 | 51.15 | 8.58 | 228.77 | 19.74 | 8.63 | 61.63 |

Composition 1

For this adhesive the EPI/DMA polymer had a negative effect. Adhesion was increased to a point which was off the measurement scale of the force transducer.

For the styrene butadiene tape shown in Table 3, both deionized water and the EPI/DMA polymer had slight detackifying effects. The polyvinyl alcohol showed improved detackification, and composition 1 again showed the best performance. Adhesion was decreased by approximately 60% with a treatment level of 5 ppm composition 1.

Having described our invention, it is claimed as follows:

1. A method for detackifying adhesive contaminants in paper pulps composed predominantly of secondary fibers which comprises adding to the pulp a detackifying amount of a water soluble dispersant comprising a water soluble terpolymer formed from a distillation product of monomers, said monomers consisting of (a) polyethylene glycol in an amount greater than about 80% by weight of the water-soluble dispersant; (b) a phthalic ester moiety derived from either a phthalic ester or a phthalic acid; and (c) a simple glycol selected from the group consisting of ethylene glycol, propylene glycol, neopentyl glycol and diethylene glycol wherein the phthalic ester moiety and the simple glycol are present in an amount less than about 20% by weight of the water-soluble dispersant.

2. The method of claim 1, wherein the phthalic ester is selected from the group consisting of dimethyl terephthalate, dimethyl isophthalate, and dimethyl orthophthalate.

3. The method of claim 1, wherein the water soluble dispersant is a terpolymer derived from the distillation product of polyethylene glycol, dimethyl terephthalate, ethylene glycol; and butylated hydroxy toluene, calcium acetate hydrate, antimony trioxide, and a 25% solution of phosphorous acid dissolved in ethylene glycol.

4. The method of claim 1, wherein the water soluble dispersant is a terpolymer derived from the distillation product of polyethylene glycol, terephthalic acid, ethylene glycol; and antimony trioxide.

* * * * *